(12) United States Patent
Kwon et al.

(10) Patent No.: US 9,807,775 B2
(45) Date of Patent: Oct. 31, 2017

(54) TERMINAL FOR D2D COMMUNICATION AND REJECTING INTERFERENCE METHOD THEREOF

(71) Applicant: Electronics and Telecommunications Research Institute, Daejeon (KR)

(72) Inventors: Heon Kook Kwon, Daejeon (KR); Byung Su Kang, Daejeon (KR); Kwangchun Lee, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 185 days.

(21) Appl. No.: 14/612,727

(22) Filed: Feb. 3, 2015

(65) Prior Publication Data

US 2015/0230258 A1 Aug. 13, 2015

(30) Foreign Application Priority Data

Feb. 12, 2014 (KR) .......................... 10-2014-0016220

(51) Int. Cl.
- *H04J 3/00* (2006.01)
- *H04W 72/08* (2009.01)
- *H04L 5/14* (2006.01)
- *H04W 72/04* (2009.01)

(52) U.S. Cl.
CPC ............. *H04W 72/082* (2013.01); *H04L 5/14* (2013.01); *H04W 72/0453* (2013.01)

(58) Field of Classification Search
CPC .. H04L 5/72; H04L 5/00; H04W 52/04; H04J 1/00

USPC ................................ 370/280, 315, 279, 343
See application file for complete search history.

(56) References Cited

U.S. PATENT DOCUMENTS

| | | | |
|---|---|---|---|
| 2007/0156016 A1* | 7/2007 | Betesh | A61B 1/00016 600/102 |
| 2008/0002658 A1* | 1/2008 | Soliman | H04W 76/023 370/343 |
| 2008/0165709 A1* | 7/2008 | Soliman | H04W 72/0453 370/280 |
| 2012/0057623 A1* | 3/2012 | Yun | H04W 52/26 375/220 |
| 2013/0230026 A1 | 9/2013 | Kwon et al. | |
| 2013/0258996 A1 | 10/2013 | Jung et al. | |
| 2014/0016574 A1 | 1/2014 | Seo et al. | |

FOREIGN PATENT DOCUMENTS

KR  10-2013-0122572 A  11/2013

* cited by examiner

*Primary Examiner* — Chi H Pham
*Assistant Examiner* — Alexander O Boakye
(74) *Attorney, Agent, or Firm* — NSIP Law

(57) ABSTRACT

A terminal for performing device-to-device (D2D) communication, according to an embodiment of the present invention, includes an antenna configured to transmit/receive an uplink channel signal and a downlink channel signal, a duplexer configured to separate a transmission/reception signal of the antenna into the uplink channel signal and the downlink channel signal, a switch configured to switch the uplink channel signal in a time division duplex (TDD) scheme so as to separate the uplink channel signal into an uplink transmission block and a first reception block, and a second reception block configured to convert the downlink channel signal provided from the duplexer into a baseband.

8 Claims, 12 Drawing Sheets

TERMINAL FOR D2D COMMUNICATION AND REJECTING INTERFERENCE METHOD THEREOF

CROSS-REFERENCE TO RELATED APPLICATIONS

This U.S. non-provisional patent application claims priority under 35 U.S.C. §119 of Korean Patent Application No. 10-2014-0016220, filed on Feb. 12, 2014, the entire contents of which are hereby incorporated by reference.

BACKGROUND OF THE INVENTION

The present invention disclosed herein relates to a communication system, and more particularly, to a terminal for device-to-device (D2D) communication and an interference rejection method therefor.

A D2D communication technology for use in a cellular mobile communication system enables two adjacent terminals to directly exchange data without intervention of a base station. That is, two adjacent terminals in a cellular mobile communication network may set up a D2D link with a cellular interface, and then may exchange data through the D2D link regardless of cellular communication. Such a D2D communication technology may reduce loads on a cellular mobile communication network, and may improve transmission speeds of terminals located on cell boundaries without increasing the cost of infrastructure. Furthermore, the D2D communication technology may allow terminals located in shadow areas to access a cellular network, and may increase service capacity of a system by reducing interference.

In particular, the D2D communication technology for a cellular mobile communication system has wide cell coverage and excellent security, compared to a WiFi direct, Bluetooth or Zigbee technology. Therefore, the D2D communication technology has become more important, and has been adopted as a next-generation LTE communication standard technology candidate of the 3GPP.

According to the current state of the D2D communication technology for a cellular mobile communication system, synchronization between terminals by cellular communication should be maintained, and thus, maintenance of a cellular communication link, i.e., a downlink (DL), should be guaranteed. However, in the case of a frequency divisional duplex (FDD) cellular mobile communication terminals, D2D communication is not allowed due to difference between transmission and reception carrier frequencies. In order to overcome such a limitation, a D2D reception path may be added so that time division duplex (TDD) is used for D2D communication with the same frequency as a transmission frequency of a terminal.

However, in the case where such a terminal performs D2D communication using the same frequency as the transmission frequency in a cellular mobile communication system, the quality of the D2D communication may not be guaranteed due to interference from a terminal that performs cellular communication. Therefore, it is necessary to develop a technology for enabling a terminal that performs D2D communication to avoid interference from a terminal that performs cellular communication.

SUMMARY OF THE INVENTION

The present invention provides a transmitting/receiving device for enabling a terminal that performs D2D communication to reject interference from a terminal that performs cellular communication, and an interference rejecting method thereof.

Embodiments of the present invention provide terminals for performing device-to-device (D2D) communication, including an antenna configured to transmit/receive an uplink channel signal and a downlink channel signal, a duplexer configured to separate a transmission/reception signal of the antenna into the uplink channel signal and the downlink channel signal, a switch configured to switch the uplink channel signal in a time division duplex (TDD) scheme so as to separate the uplink channel signal into an uplink transmission block and a first reception block, and a second reception block configured to convert the downlink channel signal provided from the duplexer into a baseband.

According to an interference rejecting method of a terminal that performs D2D communication, frequency resource allocation of a single frequency band is differently configured for cellular communication and D2D communication so as to prevent interference between cellular communication and D2D communication. Based on the above-mentioned frequency resource allocation, an uplink signal of cellular communication which is an interference signal is attenuated through RF band and baseband filters, so as to block the effect of a reception path due to a signal for D2D communication.

Furthermore, based on the frequency resource allocation, a signal to noise ratio of a D2D communication signal may be detected from an uplink channel signal, and, if the signal to noise ratio is lower than a reference value, a request for increase of transmission power may be sent to the other party terminal that performs D2D communication with the terminal.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
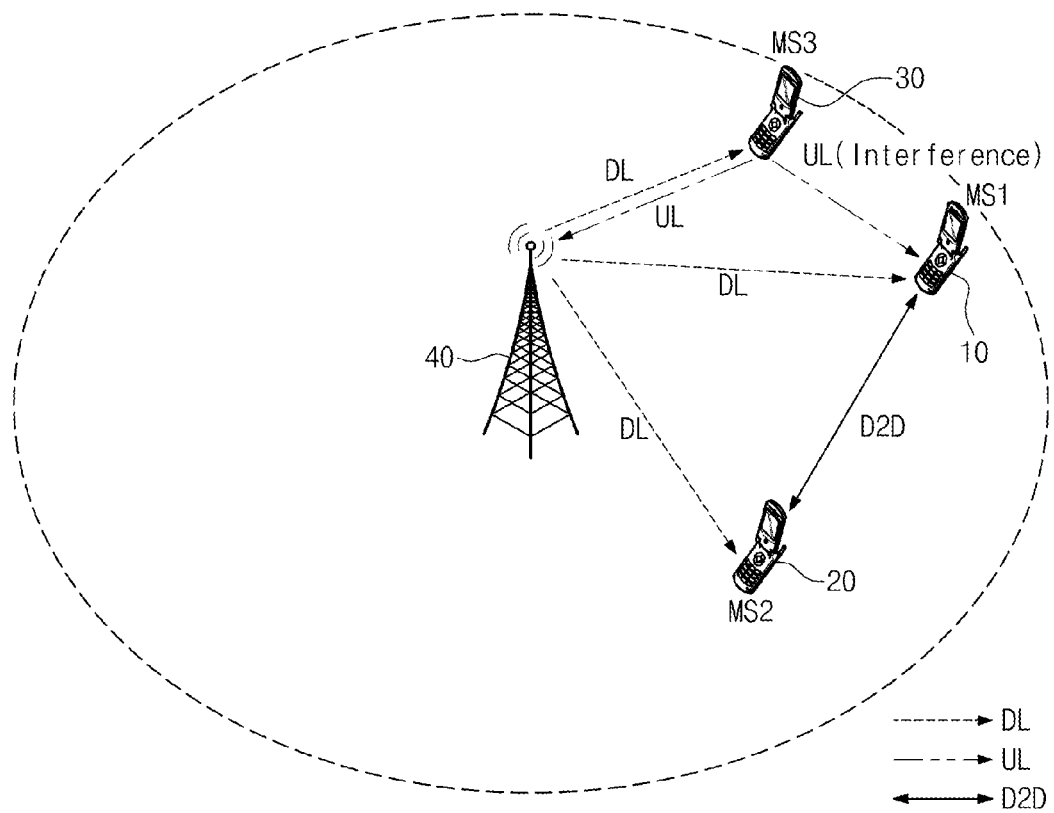
FIG. 1 is a schematic diagram illustrating device-to-device (D2D) communication and occurrence of interference.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

The terminology used herein is not for delimiting the present invention but for describing specific embodiments. The terms of a singular form may include plural forms unless otherwise specified. It will be understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The terms used herein, including technical or scientific terms, have the same meanings as understood by those skilled in the art. It will be further understood that terms in common usage should also be interpreted as is customary in the relevant art and not in an idealized or overly formal sense unless expressly so defined herein.

The term "terminal device" or "terminal" used herein may be referred to as user equipment (UE), a mobile station (MS), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or another term. Various examples of a terminal may include a cellular phone, a smartphone having a wireless communication function, a personal digital assistant (PDA) having a wireless communication function, a wireless modem, a mobile computer having a wireless communication function, an imaging device such as a digital camera having a wireless communication function, a gaming device having a wireless communication function, a music storing and playing device having a wireless communication function, a home appliance capable of wireless internal access and browsing, or a mobile unit or terminal incorporating a combination of the foregoing functions, but are not limited thereto.

The term "cell" or "base station" used herein represents a fixed or mobile point communicating with a terminal, and may include a base station, node-B, eNode-B, a base transceiver system (BTS), an access point, a transmit point, a receive point, a remote radio head (RRH), a remote radio element (RRE), a remote radio unit (RRU), a relay, and a femto cell.

In the description, when it is described that a certain part includes certain elements, the part may further include other elements. The embodiments exemplified and described herein include complementary embodiments thereof. Hereinafter, the embodiments of the present invention will be described in detail with reference to the accompanying drawings.

FIG. 1 is a schematic diagram illustrating device-to-device (D2D) communication and occurrence of interference. Referring to FIG. 1, a cell 50 formed by a base station 40 may include a plurality of terminals 10, 20 and 30. Here, the first and second terminals 10 and 20 currently perform D2D communication, and the third terminal 30 currently performs cellular communication.

The first and second terminals 10 and 20 for performing D2D communication use an uplink channel as a D2D communication channel. In general, in the case of terminals used for frequency divisional duplex (FDD) cellular communication, a transmission carrier frequency is different from a reception carrier frequency. Therefore, the first and second terminals 10 and 20 divide the transmission carrier frequency in a time divisional duplex (TDD) scheme so as to enable FDD D2D communication. That is, the first and second terminals 10 and 20 time-divide an uplink channel for cellular communication so as to use the divided uplink channel as transmission and reception channels for D2D communication.

Each of the terminals 10 to 30 may receive control information from the base station 40 through a downlink (DL) channel. In particular, the first and second terminals 10 and 20 for performing D2D communication may receive, from the base station 40, communication link for D2D communication through the DL channel. Therefore, even in the case of performing D2D communication, the first and second terminals 10 and 20 may be able to constantly receive a cellular downlink signal.

The third terminal 30 has the same transmission/reception system as that of the first and second terminals 10 and 20. In this case, the third terminal 30 has an uplink channel of the same frequency as that of the first and second terminals 10 and 20. Therefore, when the third terminal 30 performs cellular communication with the base station 40 while being adjacent to the first and second terminals 10 and 20, a frequency for the cellular communication may overlap with that for the D2D communication of the first and second terminals 10 and 20. In particular, as the third terminal 30 becomes close to a boundary of the cell 50 or becomes far from the base station 40, the third terminal 30 increases transmission power. In this case, a transmitted signal for the cellular communication of the third terminal 30 interferes with the D2D communication of the first and second terminals 10 and 20. Furthermore, the third terminal 30 performs cellular communication with the base station 40 using a downlink and an uplink.

According to the above-described scenario, an uplink signal of the third terminal 30 causes interference on the first terminal 10 that performs D2D communication at an adjacent location to the third terminal 30. According to a D2D communication method according to the present invention, the interference from the third terminal 30 may be rejected by efficiently allocating frequency resources. Furthermore, the interference from the third terminal 30 may be offset by controlling transmission power of the terminals that perform D2D communication. Such a technique will be described in detail with reference to the drawings.

Figure 2:
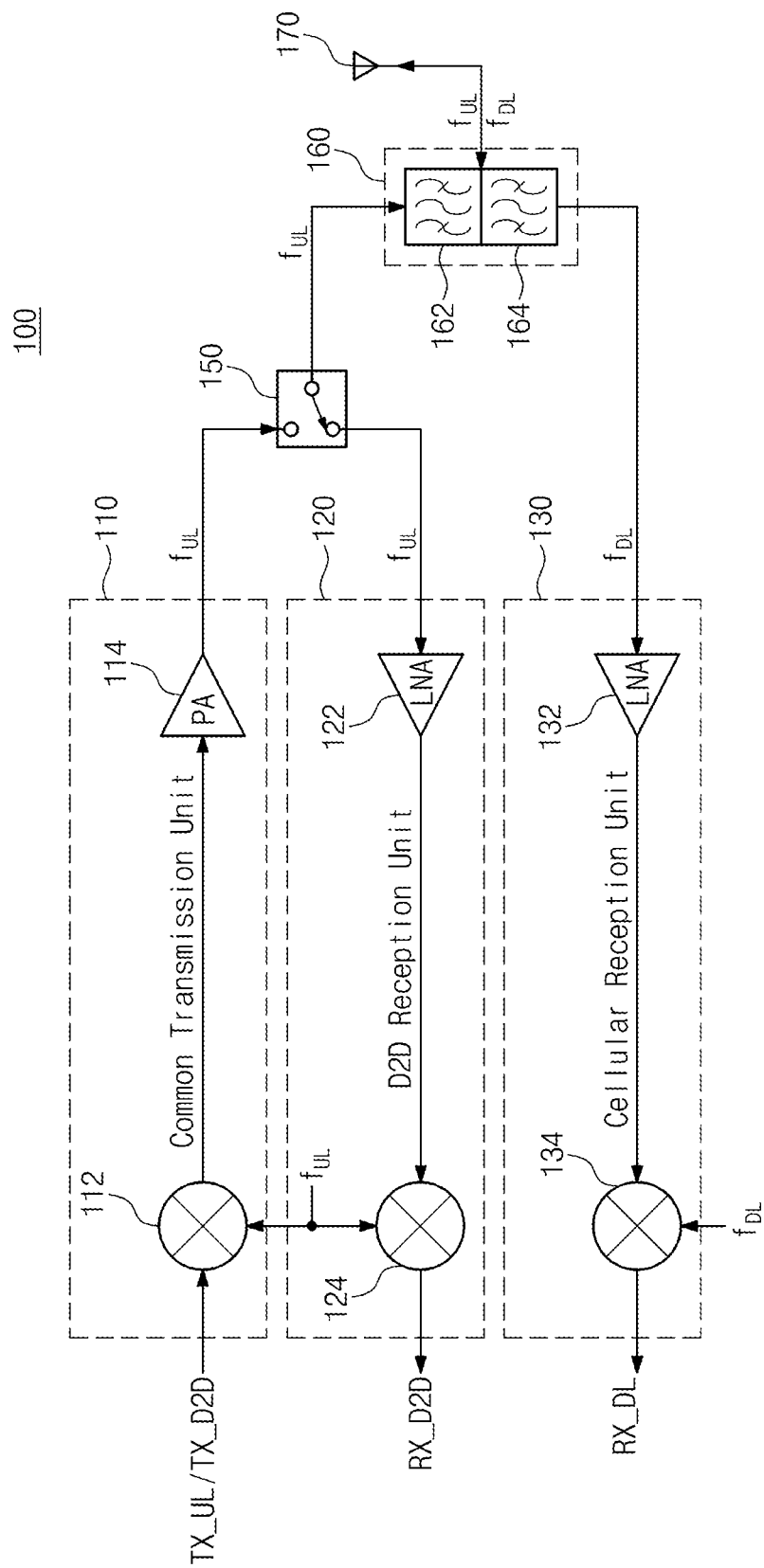
FIG. 2 is a block diagram illustrating a transmitting/receiving structure of a terminal according to an embodiment of the present invention.

FIG. 2 is a block diagram illustrating a transmission/reception structure of a terminal according to a first embodiment of the present invention. Referring to FIG. 2, a terminal 100 of the present invention includes a common transmission unit 110 used for both cellular communication and D2D communication, a D2D reception unit 120, and a cellular reception unit 130. The terminal 100 may include a switch 150, a duplexer 160 and an antenna 170.

The common transmission unit 110 modulates and amplifies a cellular transmission signal TX_UL of a baseband or a D2D transmission signal TX_D2D into an uplink frequency $f_{UL}$. For this function, the common transmission unit 110 may include a mixer 112 and a power amplifier 114. In a cellular communication mode, the cellular transmission signal TX_UL may be modulated into the uplink frequency $f_{UL}$ so as to be output. On the contrary, in a D2D communication mode, the D2D transmission signal TX_D2D may be modulated into the uplink frequency $f_{UL}$ so as to be output.

The D2D reception unit 120 amplifies a D2D reception signal transferred from the switch 150 at a D2D reception time slot so as to demodulate the D2D reception signal into a baseband. For this operation, the D2D reception unit 120 may include a low-noise amplifier 122 and a mixer 124. The mixer 124 demodulates the D2D reception signal received in a band of the uplink frequency $f_{UL}$ into a baseband signal RX_D2D.

The cellular reception unit 130 may constantly receive a cellular downlink channel signal. That is, the cellular reception unit 130 amplifies and demodulates a reception signal of cellular communication transferred from the duplexer 160 into a baseband. For this operation, the cellular reception unit 130 may include a low-noise amplifier 132 and a mixer 134. The mixer 134 demodulates a reception signal for cellular communication received in a band of a downlink frequency $f_{DL}$ into a baseband signal RX_DL.

The switch 150 serves to select between the common transmission unit 110 and the D2D reception unit 120 in a TDD scheme. The switch 150 is controlled so as to transfer an output of the common transmission unit 110 to the duplexer 160 at a transmission time slot. The switch 150 may be controlled so as to transfer a reception signal filtered by an RF band filter of the duplexer 160 which selects the uplink frequency $f_{UL}$ to the D2D reception unit 120 at a reception time slot. The uplink frequency band may be used as a transmission channel or a D2D reception channel by selection of an allocated time slot from among time slots of TDD by the switch 150. The uplink frequency band may be divided by the switch 150 with respect to transmission and reception of D2D communication. Furthermore, transmission of cellular communication may share a time slot where D2D transmission is performed. In the D2D communication mode, a D2D transmission slot and a D2D reception slot may be allocated to the uplink frequency band in a TDD scheme.

In an FDD cellular communication mode, a transmission signal and a reception signal are separated from each other using a difference between the uplink frequency $f_{UL}$ for transmission and the downlink frequency $f_{DL}$ for reception. Such signal separation is performed by the duplexer 160. On the contrary, in the case of D2D communication between terminals, the same frequency as the uplink frequency $f_{UL}$ may be used as transmission and reception carrier frequencies. That is, the uplink frequency $f_{UL}$ of cellular communication is used as carrier frequencies for transmission and reception to perform D2D communication. The switch 150 is an effective means for separating a transmission signal and a reception signal in a TDD scheme when D2D communication is performed.

The duplexer 160 separates an uplink channel and a downlink channel of cellular communication. The duplexer 160 includes an RF band filter 162 that passes the uplink frequency $f_{UL}$. Therefore, the transmission signal TX_UL corresponding to a cellular uplink and the transmission signal TX_D2D of D2D communication may be transferred to the antenna 170 by the duplexer 160. In addition, the duplexer 160 receives the reception signal RX_D2D for D2D communication from the antenna 170 and transfers the received signal to the switch 150 via the RF band filter 162. The RF band filter 162 has a characteristic of selecting the uplink frequency $f_{UL}$ of cellular communication. On the contrary, the duplexer 160 transfers a reception signal received through the downlink channel frequency $f_{DL}$ of cellular communication to the low-noise amplifier 144. The duplexer 160 includes an RF band filter 164 having a characteristic of selecting the downlink channel frequency $f_{DL}$. In this manner, the duplexer 160 may separate an uplink channel and a downlink channel using the band filters 162 and 164.

The antenna 170 is provided for cellular communication or D2D communication. The uplink signals TX_UL and TX_D2D are transmitted as radio frequency (RF) signals through the antenna 170. The downlink signals RX_DL and RX_D2D transferred in the form of RF signals may be received as electric signals through the antenna 170. It may be understood that the antenna 170 may be configured with a single or multi-antenna system.

Figure 3:
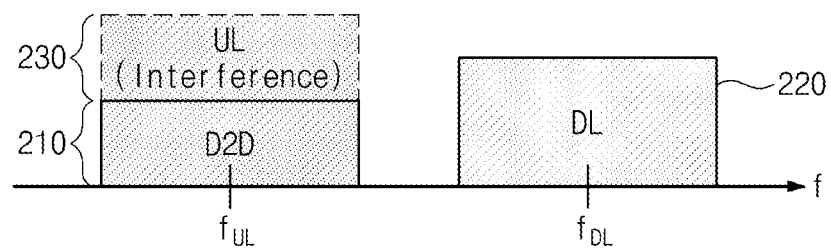
FIG. 3 is a diagram illustrating interference on a first terminal under the situation of FIG. 1.

The configuration of the terminal 100 for effectively transmitting/receiving D2D signals under the frequency resource allocation conditions of the present invention has been described. FIG. 3 is a diagram illustrating interference on the first terminal 10 having the transmission/reception structure of FIG. 2 under the situation of FIG. 1. Referring to FIG. 3, the uplink frequency $f_{UL}$ is shared as a channel for both cellular communication and D2D communication. Therefore, an uplink channel signal 230 of an adjacent terminal that is currently performs cellular communication causes a noise on terminals that currently perform D2D communication.

A D2D signal band 210 for performing D2D communication exactly overlaps with the uplink signal band 230 of cellular communication. However, a downlink signal band 220 of cellular communication does not overlap with the D2D signal band 210. Therefore, terminal may receive inter-terminal synchronization or control signals for D2D communication through the downlink signal band 220. That is, the terminals may receive control information such as a number, availability of D2D communication and call state of the other party terminal through the downlink signal band 220.

On the contrary, in the D2D signal band 210, a cellular communication signal of the third terminal causes interference on the first terminal 10 that performs D2D communication. As the third terminal 30 becomes far from the base station 40, transmission power of the third terminal 30 may increase. In this case, interference power on the D2D communication of the first terminal 10 increases. Therefore, the interference may hinder the D2D communication, and the call quality may be rapidly degraded.

In order to overcome such a limitation, a method for allocating an uplink frequency resource or a power control method according to the present invention will be described. The methods enable D2D communication without affecting an adjacent terminal that is currently performs cellular communication.

Figure 4:
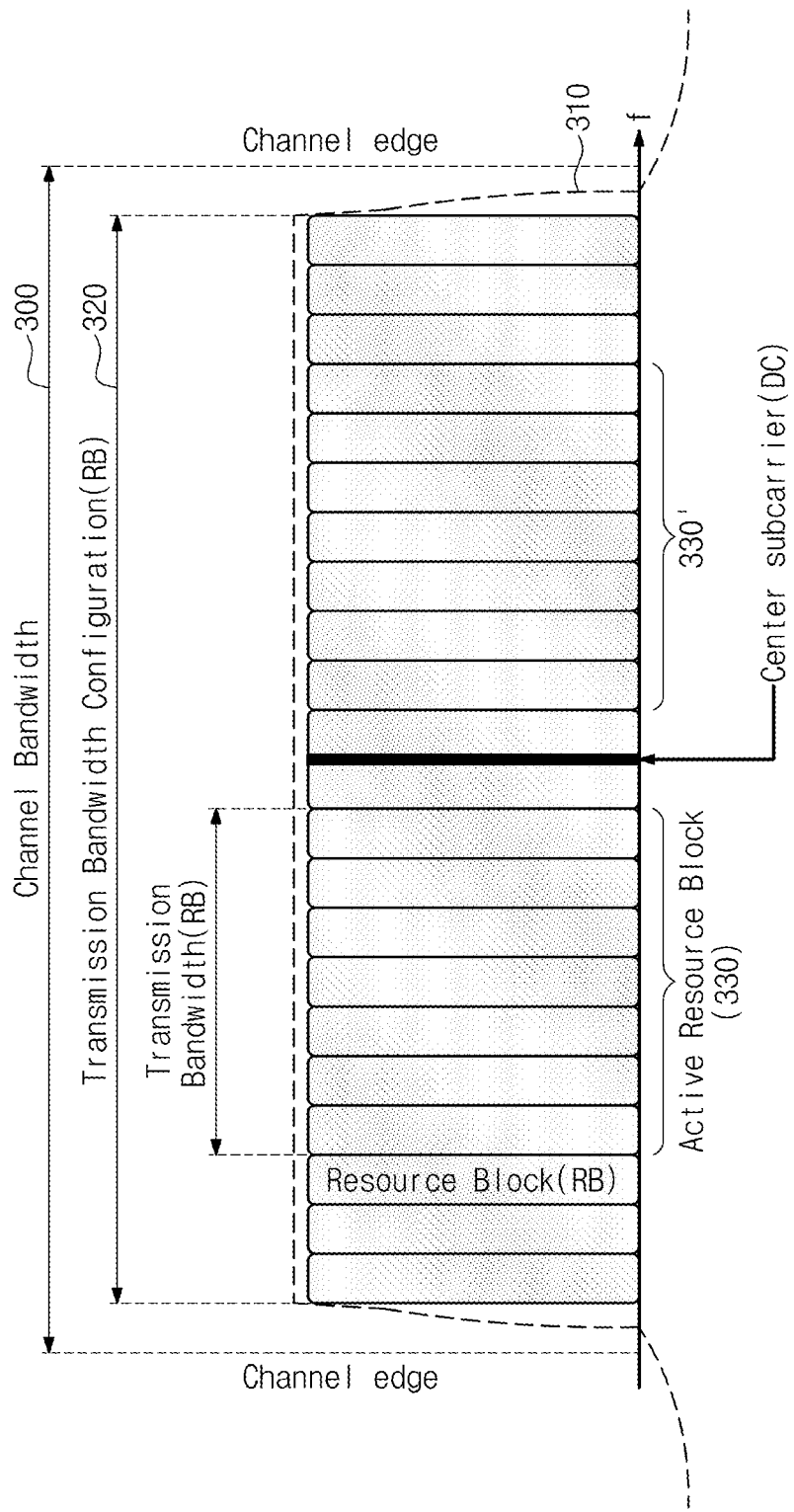
FIG. 4 is a diagram illustrating a configuration of a frequency resource within a single channel band in a typical OFDMA system.

FIG. 4 is a diagram illustrating a configuration of a frequency resource within a single channel band in a typical OFDMA system. FIG. 4 schematically illustrates an uplink channel band 310.

The channel band 310 represents a frequency band for an uplink allocated to a terminal by the base station 40. A transmission configuration band 320 is a frequency band allocated to an uplink regulated by a mask 310. In the transmission configuration band 320, frequencies are allocated substantially in units of resource block (RB). Transmission bands 330 and 330' represent bands where data transmission is substantially performed. Resource blocks may be symmetrically allocated with respect to a center subcarrier. Inactive resource blocks for cellular communication substantially exist in the transmission configuration band 320. Here, each resource block may include a plurality of subcarriers.

If an uplink signal of cellular communication and frequency allocation for transmission/reception signals of D2D communication are not differently configured in the transmission bands 330 and 330', a hybrid interference due to the uplink of cellular communication may affect a terminal that performs D2D communication. Therefore, efficient resource block allocation for the uplink of cellular communication and a channel of D2D communication are required.

Figure 5:
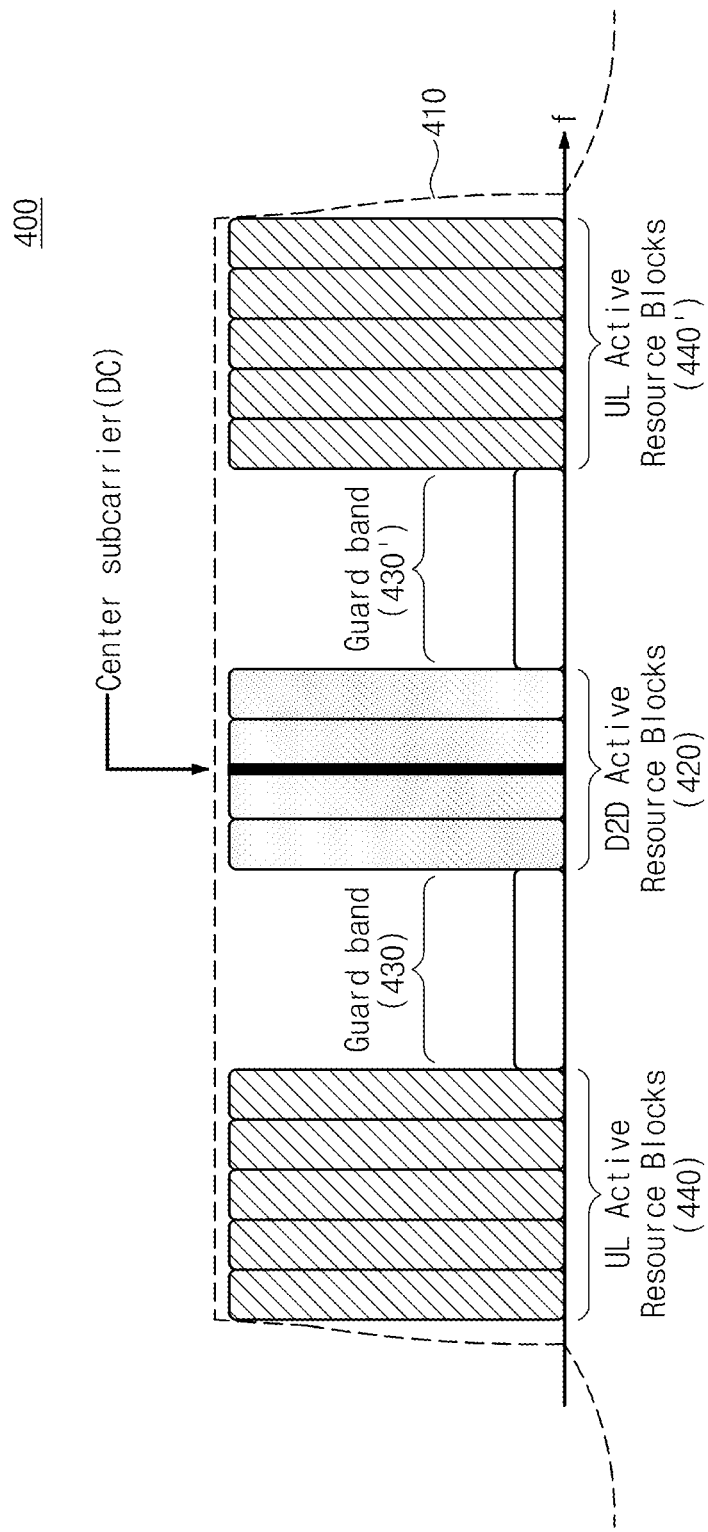
FIG. 5 is a diagram illustrating resource allocation according to an embodiment of the present invention.

FIG. 5 is a diagram illustrating a method for allocating a frequency resource according to a second embodiment of the present invention. Referring to FIG. 5, in an uplink channel band 400, resource blocks for D2D communication and resource blocks for cellular communication may be separately allocated. It may be understood that such frequency resource block allocation is based on the structure of the terminal 100 of FIG. 2.

Resource blocks 420 of a center subcarrier are allocated for D2D communication. Bands 430 and 430' adjacent to resource blocks 420 of D2D communication may be allocated as guard bands. Resource blocks 440 and 440' for uplinks of cellular communication may be allocated while being adjacent to the guard bands 430 and 430' respectively.

In this manner, the resource blocks 420 for D2D communication and the uplink resource blocks 440 and 440' for cellular communication are allocated as frequency resources separated by the guard bands 430 and 430'. Through the frequency resource allocation, an uplink signal that acts as an interference signal on a terminal that performs D2D communication may be efficiently removed using an RF band filter and a baseband filter. Here, the uplink resource blocks 440 and 440; and the resource blocks 420 for D2D communication may be interchangeably allocated. That is, the uplink resource blocks 440 and 440' may be allocated to the position of the center subcarrier, and the resource blocks 420 for D2D communication may be allocated to the outer sides of the channel band.

Figure 6:
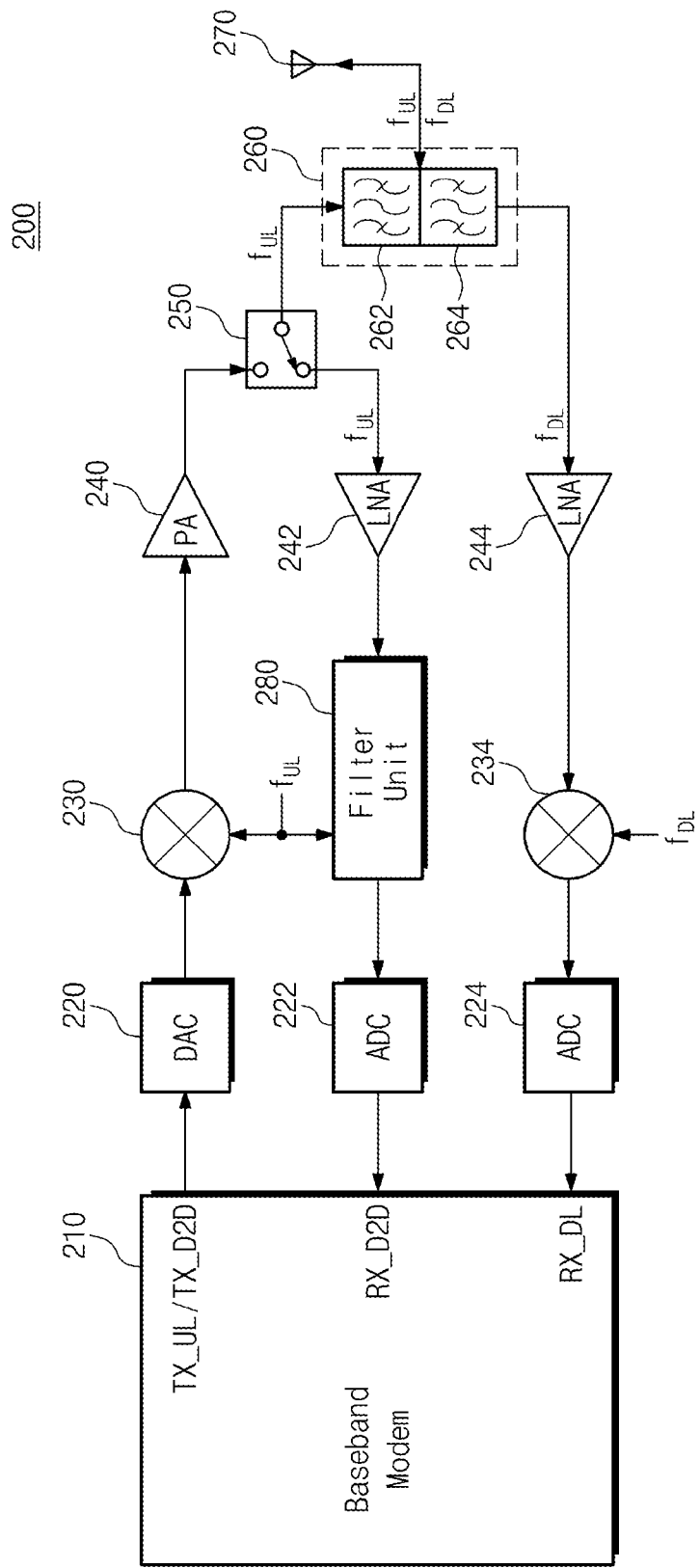
FIG. 6 is a block diagram illustrating a structure of a terminal for filtering interference according to another embodiment of the present invention.

FIG. 6 is a block diagram illustrating a terminal 200 for rejecting interference through a filtering operation, according to a third embodiment of the present invention. Referring to FIG. 6, the terminal 200 may include a baseband modem 210, a DAC 220, an ADCs 222 and 224, mixers 230 and 234, a power amplifier 240, low-noise amplifiers 242 and 244, a switch 250, a duplexer 260, an antenna 270, and a filter unit 280.

The baseband modem 210 generates transmission data and demodulates reception data for cellular communication or D2D communication. Control data and message data to be transmitted through uplink and downlink channels are generated by the baseband modem 210. The terminal 200 may generate transmission data TX UL of cellular communication and transmission data TX D2D of D2D communication through the baseband modem 210, and may transfer the generated data to the DAC 220. For D2D communication, the baseband modem 210 receives reception data RX_D2D from the ADC 222. In addition, the baseband modem 210 may receive and process the control data and message data RX_DL received through a downlink channel of cellular communication.

The DAC 220 converts the transmission data TX_UL/TX_D2D generated by the baseband modem 210 into an analog signal. The ADC 22 converts a reception signal for D2D communication processed by the filter unit 280 into digital data. The ADC 224 converts a reception signal received in the terminal 200 through a downlink channel of cellular communication and demodulated to a baseband domain into digital data.

The mixer 230 modulates a transmission signal provided from the DAC 220 into a band of a carrier frequency $f_{UL}$ of an uplink channel. The power amplifier 240 amplifies power of a signal provided from the mixer 220. The power amplifier 240 amplifies a signal up-converted by the mixer to a level enabling radio emission through the antenna 270.

The switch 250 is provided to the terminal for D2D communication. In the case of FDD cellular communication, a transmission signal and a reception signal are separated from each other using a difference between the uplink frequency $f_{UL}$ and the downlink frequency $f_{DL}$. Such signal separation is performed by the duplexer 260. On the contrary, in the case of D2D communication between terminals, transmission and reception carrier frequencies may be equal to each other. That is, the uplink frequency $f_{UL}$ of cellular communication is used as carrier frequencies for transmission and reception to perform D2D communication.

Therefore, for D2D communication, a transmission signal and a reception signal may be separated from each other in a TDD scheme. To perform D2D communication, time slots are separately allocated for transmission and reception. At a transmission slot interval, the switch 250 transfers the transmission signal TX_D2D provided from the power amplifier 240 to the duplexer 260. On the contrary, at a reception slot interval, the switch selects the reception signal RX_D2D received from the duplexer 260 and transfers the selected signal to the low-noise amplifier 242.

The duplexer 260 separates an uplink channel and a downlink channel of cellular communication. The duplexer 260 includes an RF band filter 262 that passes the uplink frequency $f_{UL}$. Therefore, the transmission signal TX_UL corresponding to a cellular uplink and the transmission signal TX_D2D of D2D communication may be transferred to the antenna 270 by the duplexer 260. In addition, the duplexer 260 receives the reception signal RX_D2D for D2D communication from the antenna 270 and transfers the received signal to the switch 250 via the RF band filter 262. The RF band filter 262 has a characteristic of selecting the uplink frequency $f_{UL}$ of cellular communication. On the contrary, the duplexer 260 transfers a reception signal received through the downlink channel frequency $f_{DL}$ of cellular communication to the low-noise amplifier 244. The duplexer 260 includes an RF band filter 264 having a characteristic of selecting the downlink frequency $f_{DL}$. In this manner, the duplexer 260 may separate an uplink channel and a downlink channel using the RF band filters 262 and 264.

The antenna 270 is provided for cellular communication or D2D communication. The uplink signals TX_UL and TX_D2D are transmitted as RF signals through the antenna 270. The downlink signals RX_DL and RX_D2D transferred in the form of RF signals may be received as electric signals through the antenna 270. It may be understood that the antenna 270 may be configured with a single or multi-antenna system.

The filter unit 280 efficiently selects a frequency allocated for D2D communication according to the frequency resource allocation of the present invention. That is, the filter unit 280 may separate an uplink signal and a D2D communication signal according to the frequency resource allocation of the present invention. The filter unit 280 may include a baseband filter for selecting the D2D communication signal. Accordingly, the filter unit 280 selects the D2D communication signal and transfers the D2D communication signal to the ADC 222.

The configuration of the terminal 200 for effectively transmitting/receiving D2D signals under the frequency resource allocation conditions of the present invention has been described. In particular, according to the frequency resource block allocation of FIG. 5, a D2D transmission/reception signal and a cellular transmission signal may be effectively separated from each other by the filter unit 280 within the uplink frequency $f_{UL}$. Therefore, a signal for cellular communication which causes interference on D2D communication may be effectively removed. The filter unit 280 of the terminal 200 of the present invention has high selectivity for an uplink signal of cellular communication, and thus, the call quality of D2D communication may be guaranteed.

Figure 7:
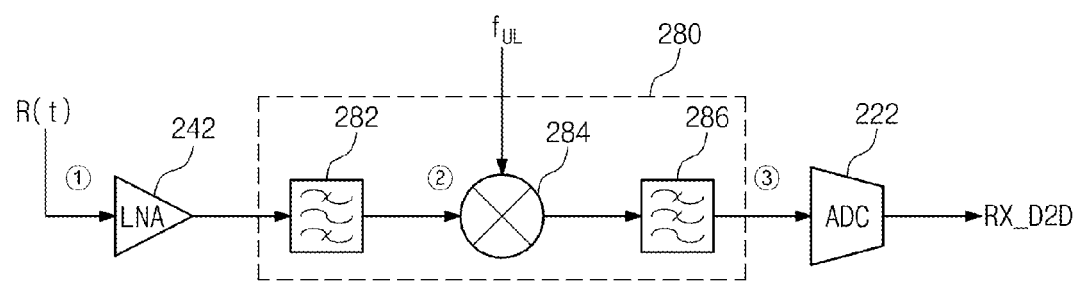
FIG. 7 is a block diagram illustrating the filter unit of FIG. 6.
Figure 8A:
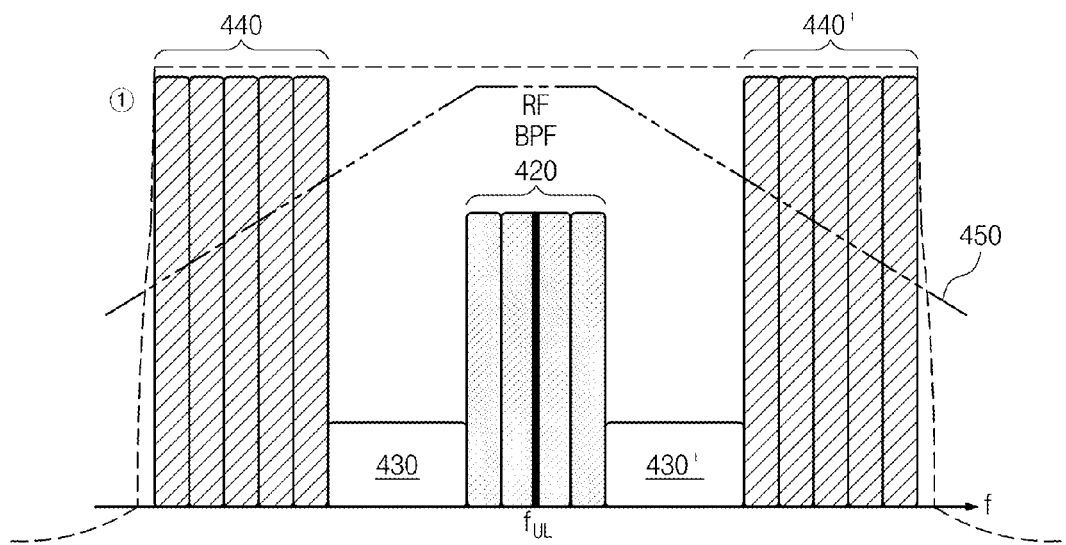
FIGS. 8A to 8C are diagrams illustrating an operation of the filter unit of FIG. 7.
Figure 8B:
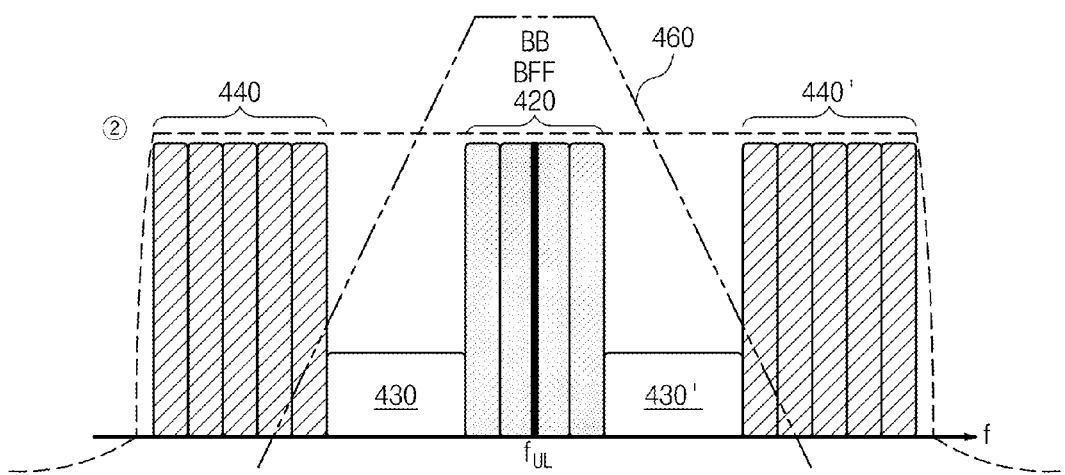
Figure 8C:
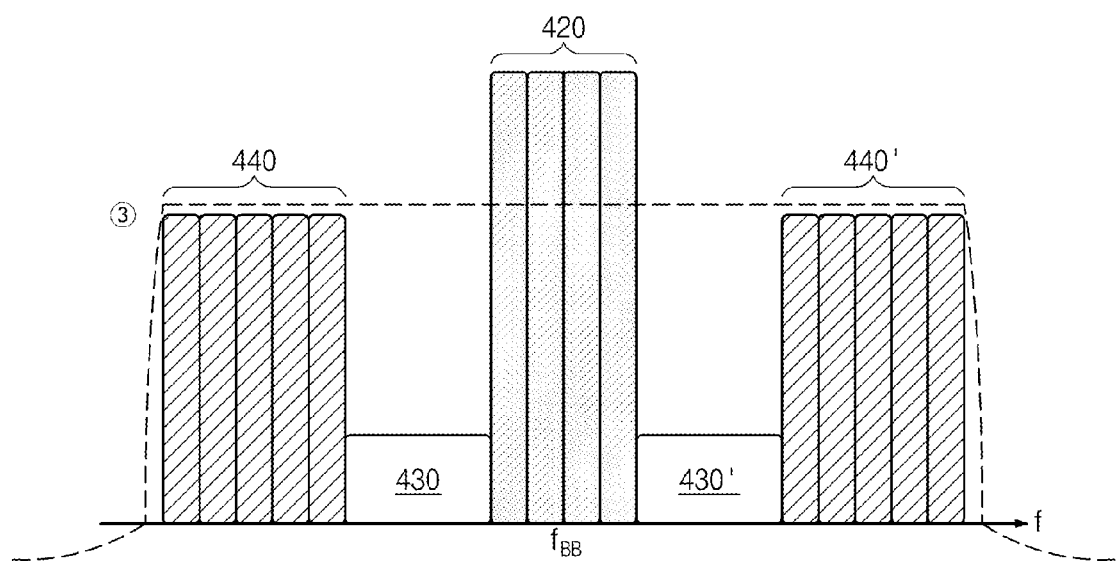

FIGS. 7 and 8A to 8C are diagrams illustrating a structure of the filter unit 280 and an operation thereof under the frequency resource allocation conditions of FIG. 5. FIG. 7 is a block diagram illustrating a detailed configuration of the filter unit 280, and FIGS. 8A to 8C are diagrams illustrating filtering processes for a reception signal.

Referring to FIG. 7, the filter unit 280 includes an RF band filter 282 and a baseband filter 286. A reception signal ① is transferred to the low-noise amplifier 242 via the duplexer 260. Frequency resource allocation for the reception signal ① is configured as described above with reference to FIG. 5. The reception signal ① is selected by the duplexer 260 and is amplified by the low-noise amplifier 242.

The RF band filter 282 has a characteristic of selecting a signal for D2D communication from the amplified reception signal ①. That is, the RF band filter 282 has a characteristic of passing the resource blocks 420 corresponding to the signal for D2D communication in an RF band. The reception signal ① is output as a reception signal ② by the RF band filter 282.

The mixer 284 demodulates a frequency of the reception signal ② so as to shift the signal to a baseband. The channel band 400 of the reception signal ② is moved to a center subcarrier of the baseband by the mixer 284.

The baseband filter 284 selects resource blocks for D2D communication adjacent to the center subcarrier. The resource blocks allocated for D2D communication may be efficiently selected by the baseband filter 284. A reception signal ③ obtained through filtering of the baseband filter 284 is transferred to the ADC 222. The D2D signal is transferred to the baseband modem 210 by the

ADC 222.

According to the frequency resource allocation conditions according to an embodiment of the present invention, an uplink signal for cellular communication and a signal for D2D communication may be effectively separated by the filter unit 280.

FIGS. 8A to 8C are diagrams conceptually illustrating a power level of a reception signal of each stage of FIG. 7. FIG. 8A illustrates the reception signal ①, FIG. 8B illustrates the reception signal ②, and FIG. 8C illustrates the reception signal ③.

FIG. 8A illustrates signal power of each signal block of each frequency included in a channel band with respect to the reception signal ①. With respect to the reception signal ①, signal power of the resource blocks 440 and 440' of uplink signals for cellular communication is illustrated as being greater than signal power of the resource blocks 420 for D2D communication. This indicates that interference of the uplink signals for cellular communication may be high. The reception signal ① is processed by the RF band filter 282. Here, a reference numeral 450 indicates filtering characteristics of the RF band filter 282.

FIG. 8B illustrates that the reception signal ② is obtained through primary filtration by the RF band filter 282. With respect to the reception signal ②, signal power of the resource blocks 440 and 440' of uplink signals for cellular communication is illustrated as being similar to signal power of the resource blocks 420 for D2D communication. However, such illustration is merely for convenience of explanation. That is, it is illustrated that the signal power of the resource blocks 440 and 440' of uplink signals is significantly suppressed by the RF band filter 282. Thereafter, the reception signal ② is processed by the baseband filter 286. Here, a reference numeral 460 indicates filtering characteristics of the baseband filter 286. A center frequency of the reception signal ② is shifted by the mixer 284 before the reception signal ② is input to the baseband filter 284.

FIG. 8C illustrates that the reception signal ③ is obtained through filtration by the baseband filter 286. With respect to the reception signal ③, signal power of the resource blocks 440 and 440' of uplink signals for cellular communication is illustrated as being lower than signal power of the resource blocks 420 for D2D communication. That is, it is illustrated that the signal power of the resource blocks 440 and 440' of uplink signals is significantly suppressed by the baseband filter 286.

In this state, when the reception signal ③ is input to the ADC 222 and is processed by automatic gain control (AGC), the resource blocks 440 and 440' of uplink signals may be effectively filtered.

Figure 9:
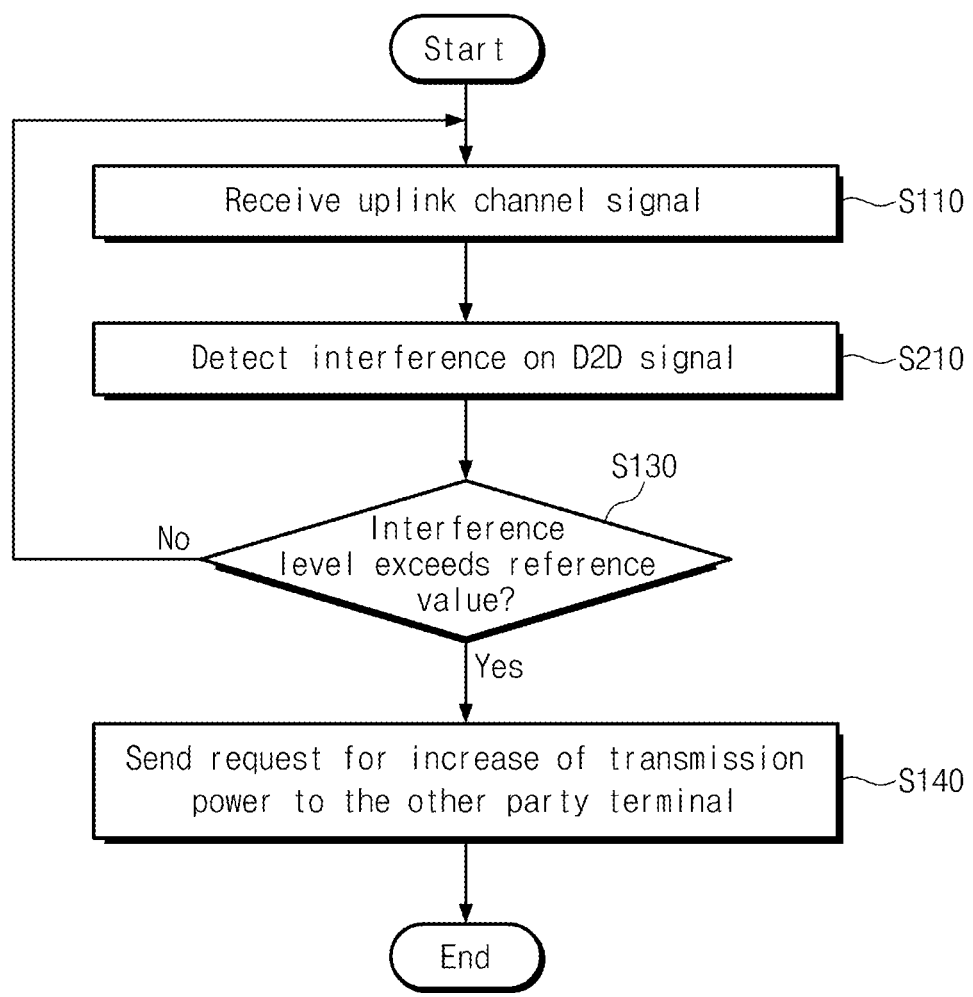
FIG. 9 is a schematic flow chart illustrating an interference rejecting method according to the present invention.

FIG. 9 is a flowchart illustrating a D2D communication method according to a fourth embodiment of the present invention. FIG. 9 illustrates a method for rejecting interference when D2D communication is performed in the state of frequency resource allocation illustrated in FIG. 4 or 5.

In operation S110, the terminal receives an uplink channel signal. A D2D signal transmitted from the terminal 20 through an uplink channel is received. In addition, an uplink signal for cellular communication transmitted from the terminal 30 through an uplink channel is introduced to receiving devices of the terminal 10. Here, the uplink signal for cellular communication transmitted from the terminal 30 causes interference on D2D communication.

In operation S120, the terminal 10 detects a level of interference on a D2D communication. For example, a degree of interference may be detected by calculating a signal to noise ratio of the D2D signal.

In operation S130, the terminal 10 performs operation branching according to whether interference satisfies minimum performance requirements of D2D communication. For example, it may be detected whether a signal to noise ratio of a D2D signal is lower than a minimum value for enabling D2D communication. If the degree of interference is lower than a reference value, the process returns to operation S110. If the degree of interference is not lower than the reference value, the process proceeds to operation S140.

In operation S140, the terminal requests increase of transmission power of the other party terminal 20. The terminal 10 may request the increase of transmission power of the terminal 20 by using a control channel through the base station 40, or may directly send a request for the increase of transmission power to the terminal 20.

Through the above-mentioned control of transmission power, the terminal 10 may maintain a minimum signal to noise ratio required for D2D communication. A method for controlling transmission power of the other party terminal may be applied regardless of allocation of resources blocks of an uplink channel. In addition, the transmission power control method may be applied to the state of resource block allocation illustrated in FIG. 5.

Figure 10A:
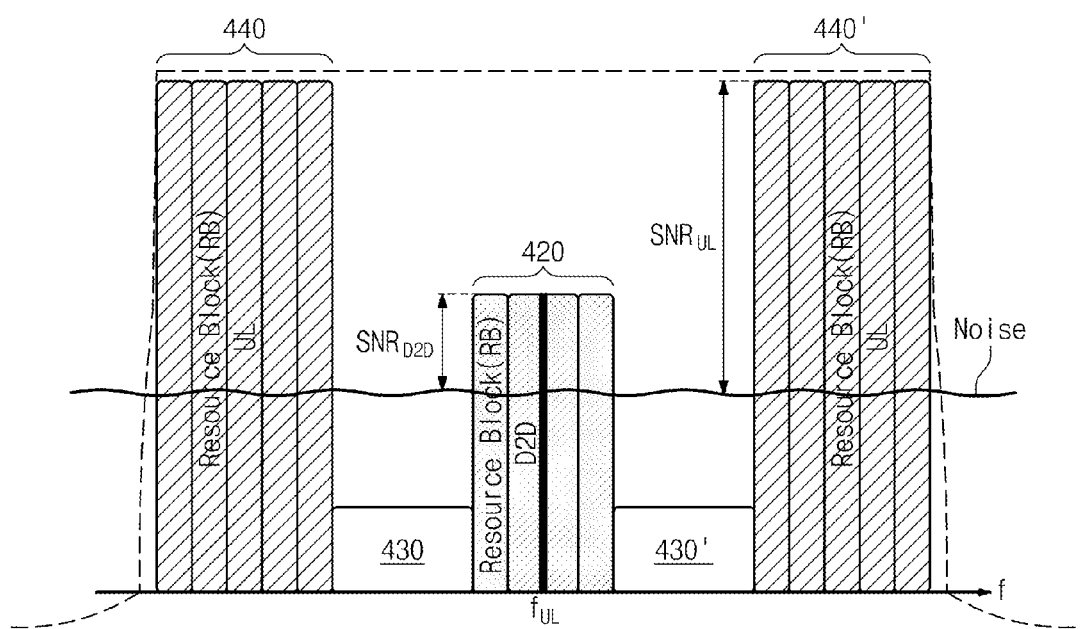
FIGS. 10A and 10B are diagrams illustrating the effect of FIG. 9.
Figure 10B:
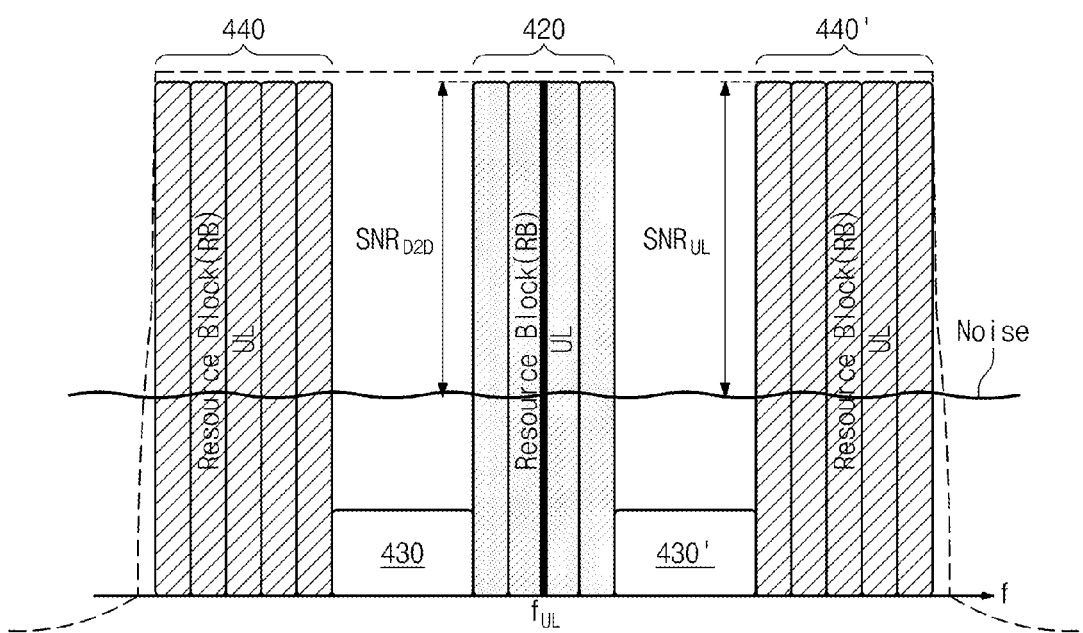

FIGS. 10A and 10B are diagrams schematically illustrating an effect of the transmission power control method of FIG. 9. FIG. 10A exemplarily illustrates power of each resource block of an uplink frequency band received by an antenna before transmission power is controlled when D2D communication is performed. FIG. 10B illustrates power of resource blocks of an uplink frequency band received by an antenna in the case where transmission power control is applied when D2D communication is performed.

Referring to FIG. 10A, power of a signal received by an antenna of a terminal when D2D communication is performed, i.e., signal power of the resource blocks 420 allocated for D2D communication, may be lower than power of the resource blocks 440 and 440' allocated to an uplink of cellular communication. That is, a signal to noise ratio $SNR_{D2D}$ of D2D communication may be lower than a signal to noise ratio $SNR_{UL}$ of an uplink signal of cellular communication. In this case, an automatic gain controller (AGC) of a terminal performs gain control in response to an uplink signal of cellular communication. Therefore, it is difficult for the terminal to perform D2D communication with ease.

In the case where transmission power control is performed on the other party terminal when D2D communication is performed, a signal of an uplink frequency band received by an antenna of a terminal may be observed as illustrated in FIG. 10B. That is, when a request for increase of transmission power is sent to the other party terminal, the signal to noise ratio $SNR_{D2D}$ of a received signal for D2D communication increases. It may be confirmed from a spectrum of signals received through the uplink frequency $f_{UL}$ that signal power of the resource blocks 420 allocated for D2D communication is increased to be equal to the signal power of the resource blocks 440 and 440' allocated to an uplink of cellular communication. That is, it may be understood that the signal to noise ratio $SNR_{D2D}$ of D2D communication becomes equal to the signal to noise ratio $SNR_{UL}$ of an uplink signal of cellular communication. In this case, the automatic gain controller (AGC) of the terminal continues to perform gain control in response to a D2D reception signal.

The embodiments of the present invention may provide a terminal that effectively rejects interference caused by cellular communication of another communication when D2D communication is performed, and may provide a method for rejecting interference that may be caused by the terminal.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A terminal for performing device-to-device (D2D) communication, comprising:
    an antenna configured to transmit/receive an uplink channel signal and a downlink channel signal;
    a duplexer configured to separate a transmission/reception signal of the antenna into the uplink channel signal and the downlink channel signal;
    a switch configured to switch the uplink channel signal in a time division duplex (TDD) scheme so as to separate the uplink channel signal into an uplink transmission block and a first reception block; and
    a second reception block configured to convert the downlink channel signal provided from the duplexer into a baseband,
    wherein, in a channel band of the uplink channel signal, frequencies are allocated in units of a plurality of frequency resource blocks,
    wherein the channel band comprises a first frequency band to which first resource blocks for D2D communication are allocated, and a second frequency band to which second resource blocks for uplink communication of cellular communication are allocated, and
    wherein the first frequency band and the second frequency band are separated from each other.

2. The terminal of claim 1, wherein the duplexer is further configured to separate the uplink channel signal and the downlink channel signal in a frequency divisional duplex (FDD) scheme.

3. The terminal of claim 1, wherein the uplink transmission block comprises an uplink block for cellular communication and a D2D communication block.

4. The terminal of claim 1, wherein the first reception block comprises reception devices for D2D communication.

5. The terminal of claim 1, wherein the second reception block is further configured to receive a downlink signal for cellular communication.

6. The terminal of claim 1, wherein the channel band further comprises a guard band interposed between the first resource blocks and the second resource blocks.

7. The terminal of claim 1, wherein the first frequency band comprises a center subcarrier frequency of the channel band, and the second frequency band is positioned at outer sides of the channel band.

8. The terminal of claim 1, wherein the first reception block comprises:
    a radio band filter configured to select the first resource blocks or the second resource blocks for a first reception signal provided from the duplexer; and
    a baseband filter configured to select the first resource blocks in a baseband.

* * * * *